O. F. SMITH.
HAY LOADER.
APPLICATION FILED JAN. 18, 1907
985,218.
Patented Feb. 28, 1911.
5 SHEETS—SHEET 2.
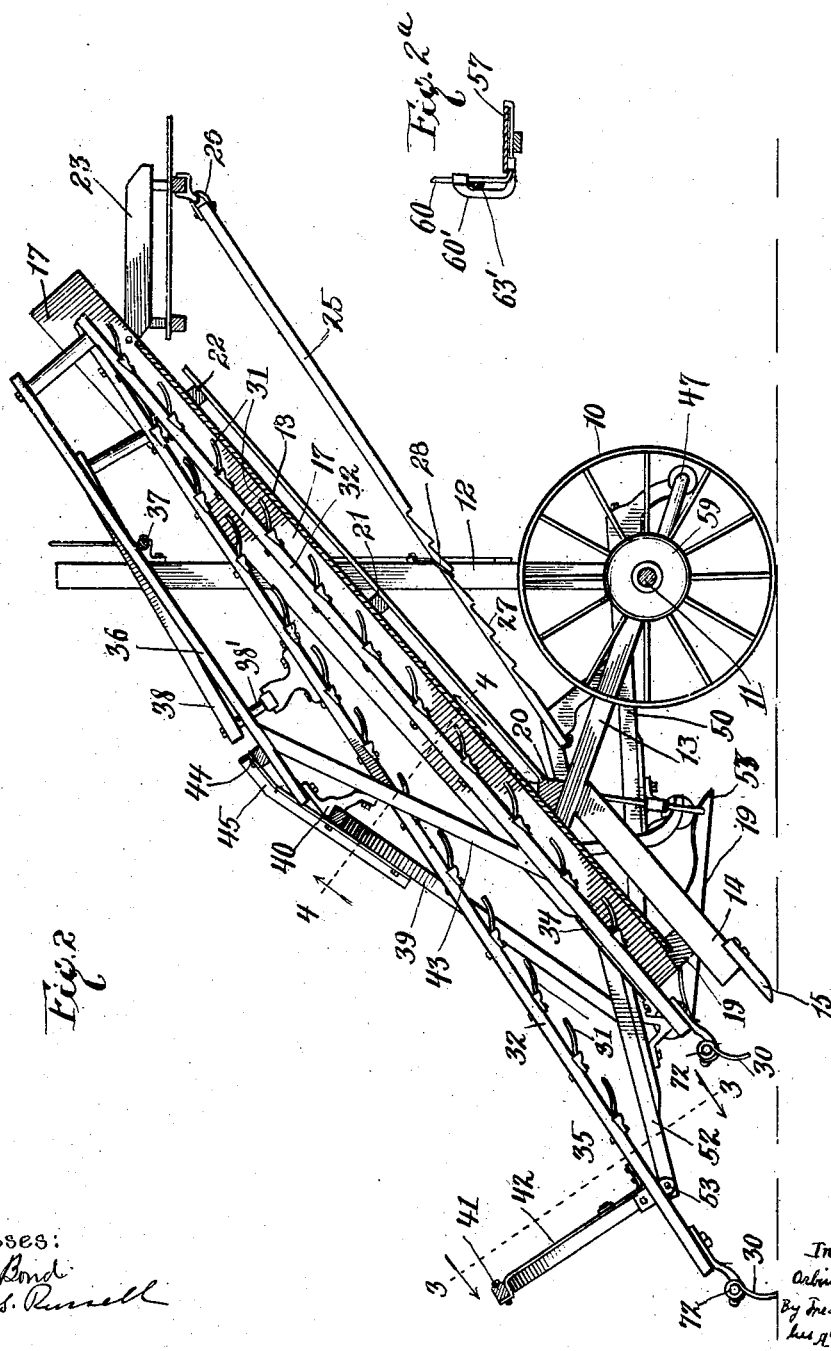

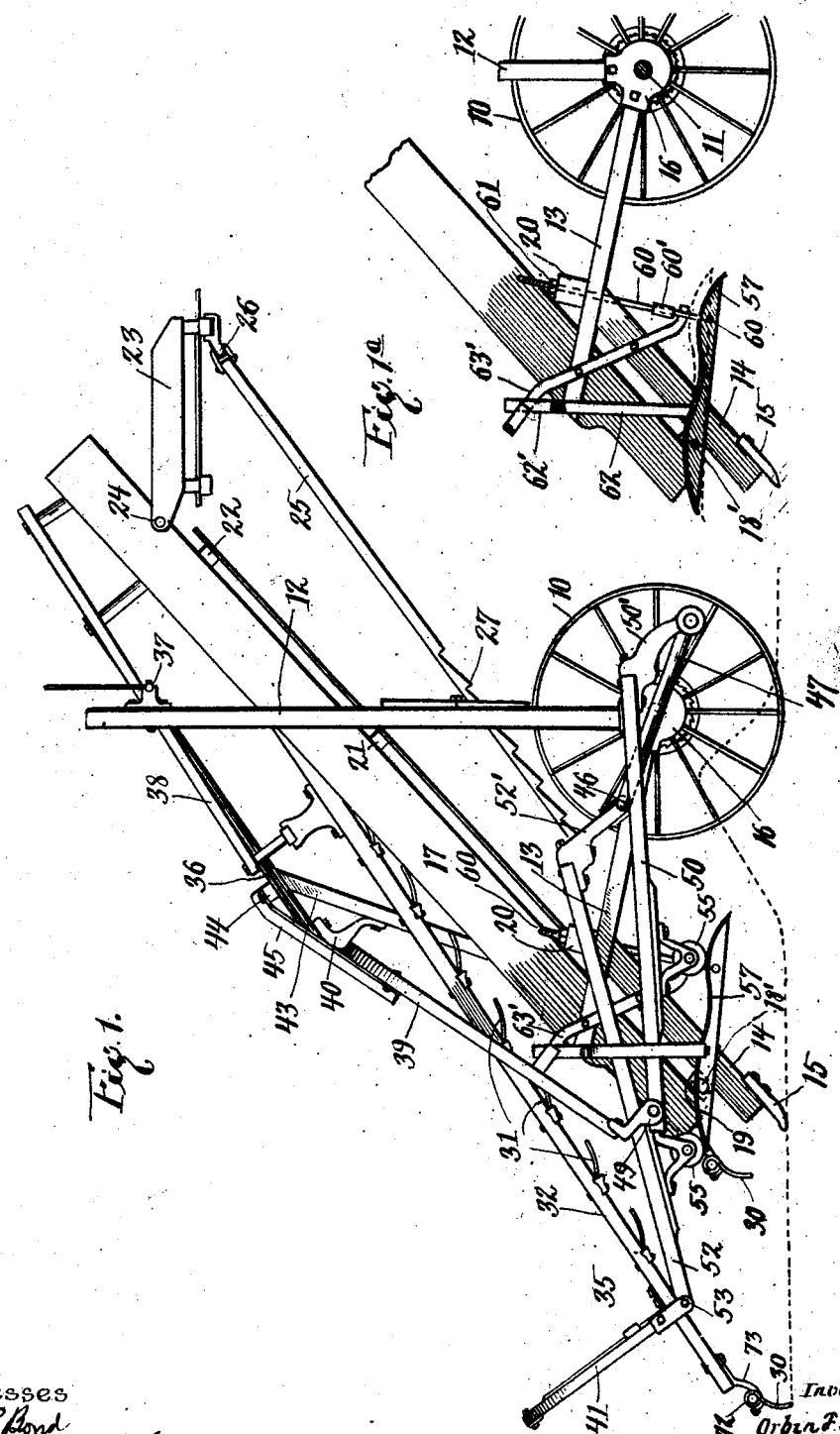

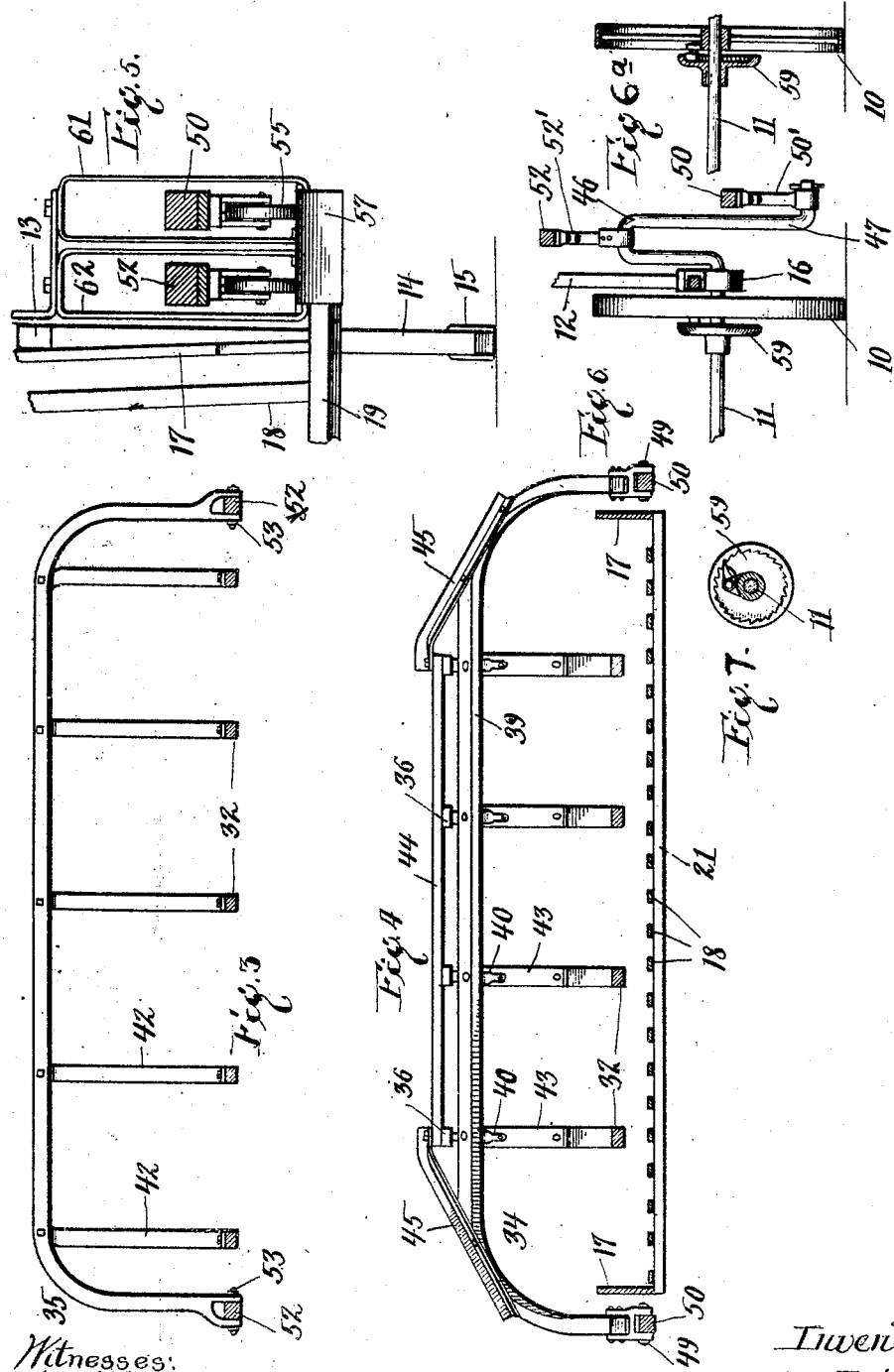

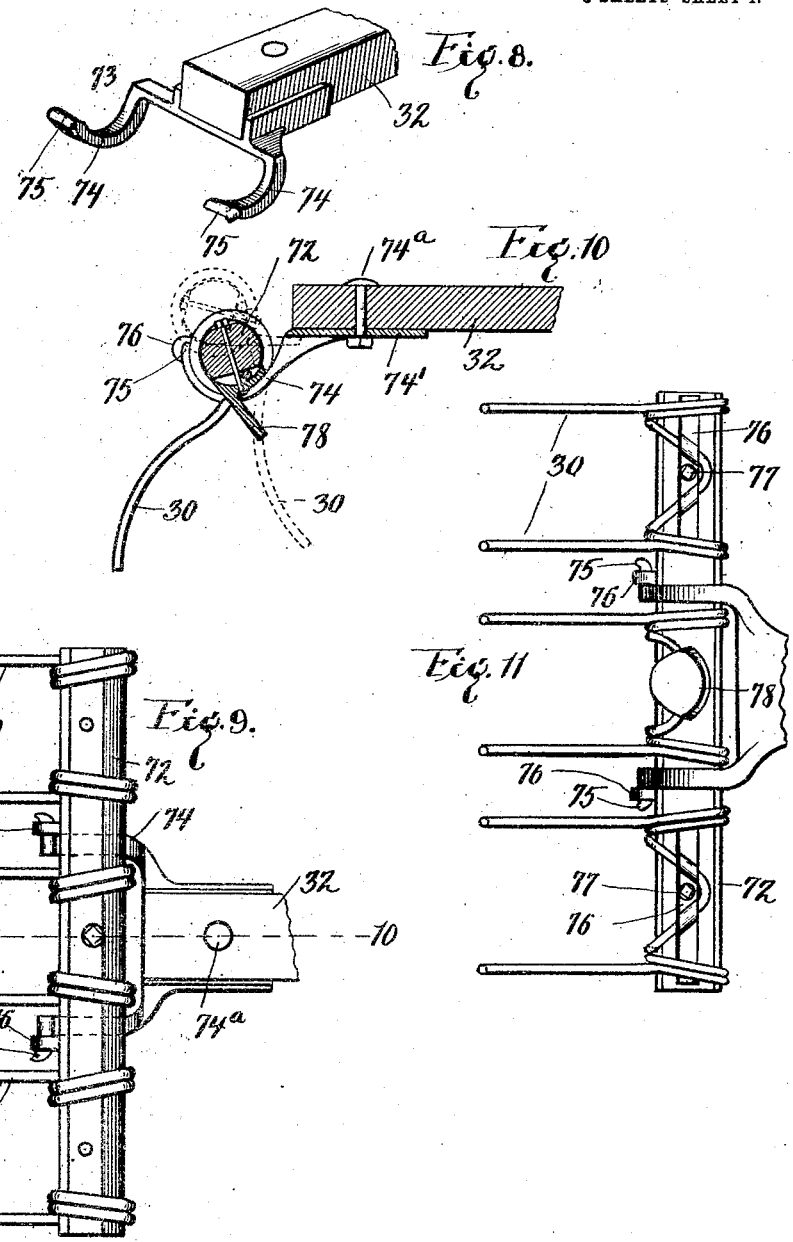

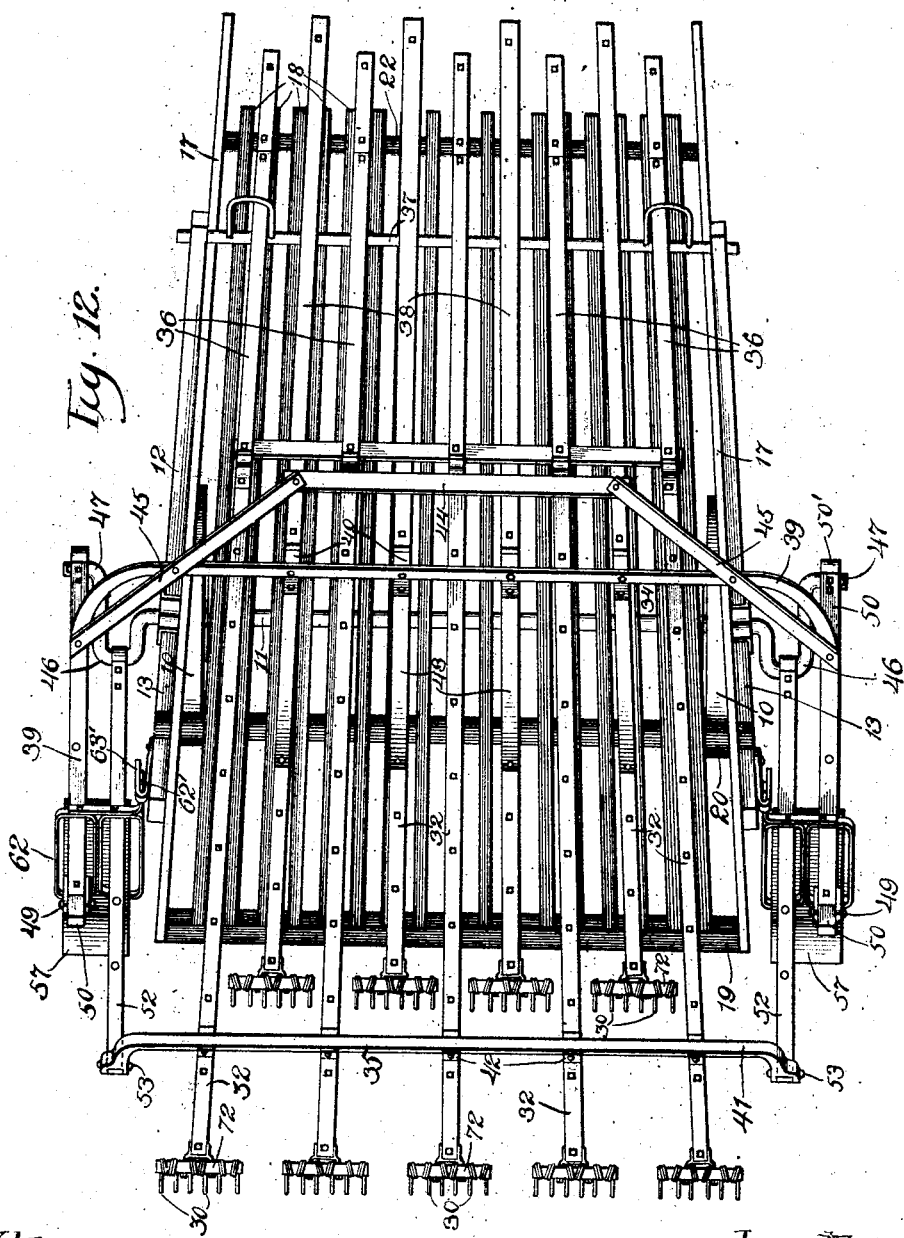

UNITED STATES PATENT OFFICE.

ORBIN F. SMITH, OF OTTUMWA, IOWA, ASSIGNOR, BY MESNE ASSIGNMENTS, TO LA CROSSE HAY TOOL COMPANY, OF LA CROSSE, WISCONSIN, A CORPORATION OF WISCONSIN.

HAY-LOADER.

985,218.  Specification of Letters Patent.  Patented Feb. 28, 1911.

Application filed January 18, 1907. Serial No. 352,926.

*To all whom it may concern:*

Be it known that I, ORBIN F. SMITH, a resident of Ottumwa, in the county of Wapello and State of Iowa, have invented certain new and useful Improvements in Hay-Loaders, of which the following is a full, clear, and exact description.

The invention relates to hay-loaders, and more particularly to those which are adapted to be connected to the rear end of a hay-wagon or rack to collect and convey the hay from the ground to the wagon.

In hay-loaders it is common to provide reciprocable rake-frames or carriers to which the gathering-points and elevator rake-teeth are connected, and mechanism for operating the carriers or frames vertically to gather the hay and elevate it to and over the elevator frame or conveyer. A desideratum in loaders of this type is to provide simple mechanism for operating the carriers to reduce the wear of the running parts so the loader will possess longevity. It is also desirable to provide mechanism which imparts to the carriers a stroke of greater length and slower speed, as contra-distinguished from the loaders in which the rakes are operated at higher speed and have quick strokes or picking movements during which the gathering-points come in contact with the ground momentarily only. Furthermore, a long stroke of the rakes is advantageous both in gathering and in elevating the hay to feed it steadily to the conveyer and upwardly thereon. It is also desirable to avoid entirely the use of gear-mechanism, belts, sprocket-wheels, and drive-shafts between the wheel-axle and the rake to simplify the construction of the rake-operating mechanism and to render the loader light of draft.

The invention designs to provide an improved loader in which these desiderata are present.

It further designs to provide simple and improved operating-mechanism in which all of the rake-carriers are operated directly by eccentric-connections rotating with the carrying-wheels and driven thereby, thus avoiding entirely the use of intermediate gearing and counter-shafts.

The invention still further designs to provide a loader in which the rake-operating levers are crank-operated at one of their ends and pivoted to the rakes at the other end, with improved means for guiding said levers medially so the gathering-points will travel in substantially rectilinear path and have a long forward stroke as the points travel along the ground.

The invention also designs to provide improved operating mechanism embodying operating-levers and tracks in which the tracks for guiding the levers are formed so that the levers will operate the carriers vertically and longitudinally and in which the use of a track-switch for controlling the vertical movement of the levers is avoided.

The invention still further designs to provide an improved device for connecting the gathering-points to the rake-carriers so the points in passing rearwardly are free to yield to any of the hay being conveyed forwardly by the oppositely traveling rakes.

The invention consists in the several novel features of construction hereinafter set forth and more particularly defined by claims at the conclusion hereof.

In the drawings: Figure 1 is a side elevation of a hay-loader embodying the invention. Fig. 2 is a central vertical longitudinal section. Fig. 1ª is a detail elevation partly in section of the track-supporting device. Fig. 2ª is a detail end view of the lower portion of one of the adjustable track-hangers, the track being shown in section. Fig. 3 is a section on line 3—3 of Fig. 2. Fig. 4 is a section on line 4—4 of Fig. 2. Fig. 5 is a section on a somewhat larger scale on line 5—5 of Fig. 2. Fig. 6 is an end view of one of the carrying wheels and adjacent parts. Fig. 6ª is a section through one of the carrying-wheels and the clutch between said wheel and the axle. Fig. 7 is a detail of the clutch for driving the carriage axle. Fig. 8 is a perspective of one of the bars and the supporting brackets for the rake-head. Fig. 9 is a plan of one of the rake-heads and supporting bracket. Fig. 10 is a section on line 10—10 of Fig. 9. Fig. 11 is an inverted plan of one of the rake-heads. Fig. 12 is a plan view of the loader viewed at right angles to the conveyer.

The hay-loader comprises an elevator or conveyer-frame mounted on carrying-wheels 10 which are cross-connected by an axle 11. The frame is supported by, and secured to standards 12, bars 13, and runners 14 which are provided with shoes 15, at their lower ends. Standards 12 and bars 13 are connected to the axle by journals or brackets 16. Slats 18 are secured together to form a suitable bottom for the conveyer, by girders 19 at the lower end of the conveyer and by girders, 20, 21 and 22. Sills 17 form the sides of the conveyer. An adjustable conveyer section 23 is pivotally connected as at 24 to the elevator-frame and is held in desired position by a strut 25 pivotally connected to the conveyer section at 26, and which has its lower end provided with a series of notches or teeth 27, which are adapted to engage a bail 28 whereby the strut will be held in position to secure the extension in position to discharge hay from the elevator at the desired elevation onto a wagon. As the load increases the operator on the wagon can adjust the section upwardly by lifting the section, the teeth of strut passing successively into engagement with bail 28 to hold the section in assigned elevation.

A pair of alternately operating rake-carriers 34 and 35 are provided with gathering-points or teeth at their lower ends. Each carrier comprises a series of rack-bars 32 to the lower end of which suitable teeth 31 are secured to feed the hay upwardly over and along the elevator bottom. Each bar 32 of rake-carrier 34 is provided with a guide-bar or rail 36 near its upper end which is adapted to rest on a cross-rod 37 to guide the upper end of the carrier. Each bar 32 of carrier 35 is provided with a guide-bar or rail 38 which is adapted to rest on a cross-bar 37 secured to standards 12 to guide the upper end of said rake. Near their lower ends, the rake-bars 32 of carrier 35 are cross-connected by an arch bar 41 to which the rake-bars are each secured by a bracket or hanger 42. Bars 32 of carrier 34 are secured together by an arch-bar 39 which is secured to guide-bars 36 by brackets 40 which are also secured to braces 43. If desired, a cross-bar 44 and diagonal braces 45 may be employed to secure the rake-bars of rake 34 more rigidly together. The cross-supports for the lower portion of the carriers respectively are arranged so that the reciprocatory movement thereof in opposite directions respectively is not interfered with.

In the operation of hay-loaders in which reciprocating rakes are employed, a long substantially horizontal and rectilinear forward stroke for the lower ends or gathering points of the rakes and a quick upward movement at the end of the horizontal stroke to deliver the accumulated hay from the ground onto the elevator-bottom is desirable. In the present invention such movement is imparted to the rakes by levers, one end of which is connected to a rotating eccentric connection on the wheel-axle, while the other end of the lever or bar is connected to the rake. Between the ends of these levers is provided a track or guide whereby the reciprocatory movement of the connecting-bar is translated or modified so that the lower end of the rake will, during a portion of its travel, move in a rectilinear path to sweep the ground clean and then quickly elevate the rake to lift the hay from the ground onto the elevator-bottom where the rakes will feed it upward.

Wheel-axle 11 is provided which has at each of its ends a compound crank or cranks 46 and 47 for driving the rakes. These cranks are oppositely arranged to operate the rakes in opposite directions. Rake-carrier 34 has pivoted thereto at each side as at 49 a lever 50 which has its front end pivotally connected to crank 47. A like lever 52 at each side of the elevator, has one of its ends pivotally connected as at 53 to rake-carrier 35 and its other end connected to crank 46. Each of the levers 50, 52, is provided with a roller-abutment 55, medially disposed thereon to support and guide the levers between their pivotal connections to the cranks and carriers respectively. The abutments are arranged to travel on a curved elongated track 57. These tracks guide the levers to effect a substantial rectilinear movement of the gathering-points of the rakes during that portion of their movement in which they travel over the ground. Each track 57 is curved as shown so that the levers, which have one of their ends pivoted to one of the rotating cranks, will cause the rakes to be operated so the gathering-points will travel in a substantially rectilinear horizontal path to gather the hay and then quickly upward to sweep it onto the elevator. In other words, the track or guide for the lever operates as a translating or compensating medial lever-guide or support whereby the desired vertical movement of the rakes will be effected by the crank-operated levers, the course of the gathering-points is shown by dotted line Fig. 1, as they move forwardly with the carriage during the operation of the rakes, which are driven directly by the carrying-wheels. The cranks are preferably of sufficient radius to impart to the rakes a long stroke and being driven directly by the carrying-wheels they rotate rather slowly. This results in a long and comparatively slow operation of the rakes which produces efficient gathering and moreover renders the machine exceedingly light of draft.

The low speed of the working parts materially reduces wear of the parts and avoids destructive vibration so the machine in its entirety possesses longevity. The long, low speed stroke of the rakes causes them to rapidly and steadily advance the hay over the elevator-bottom regularly and evenly and avoids tangling and wadding of the hay. By employing a track to guide and support the crank-operated levers medially, the desired irregular vertical movement can be imparted to the lever to cause the gathering-points to travel forwardly in rectilinear path, without other translating or controlling means.

It will be observed that the cranks for operating both of the rake-operating levers are secured to the axle and are concentrically arranged with respect to the carrying-wheels and that the carriers are operated directly by the levers without the use of intermediate belting or translating-levers. This is an advantageous feature of the invention because a large number of parts heretofore necessary in the operation of devices of this class are dispensed with, and motion is imparted from the wheel-driven cranks which provide eccentric-connections for the levers rotating concentrically with the carrying-wheels, which drive the operating-levers and the rakes. Suitable clutches 59 between each of the carrying-wheels and the axle, drive the axle and form a one-way connection whereby the rakes will be operated only when the loader travels forwardly. The levers are provided with an angular bracket 50', 52' respectively, and the cranks are disposed on the outer ends of the axle.

In order to regulate to a nicety the working of the gathering-points over the ground, the tracks are adjustably supported. Each track is pivotally sustained at 18' on the end of cross-bar 18 and has its front end adjustably sustained by a hanger-rod 60 provided at its upper end with an adjusting nut 61, whereby the track can be raised or lowered. Guide-loops 62 and 63 are provided for securing the levers against lateral play and interference of the levers one with the other. A bracket 62' guided in a brace 63' secures the loops laterally; and said brace has its front end extended into a loop 60' secured to hanger-rod 60. The position of the track-pivot is arranged so that when the track is adjusted, the horizontality of the path of the gathering-points will be maintained.

The gathering-points preferably consist of yielding or resilient teeth or points 30 each of which has its upper end coiled about a transversely extending rake-head 72 which is eccentrically and pivotally sustained in a bifurcated support or bracket 73 secured to the lower end of each of the rake-bars. The head is arranged to normally engage abutments 74 of the bracket when the loader is advancing over the ground. The forked-support has pivots 75 held in eyes 76 secured to the head so the latter is free to permit backward movement of the rakes when necessary, and a stop 74 limits the upward movement of the head.

The rake-heads are preferably of sufficient width to carry a plurality of gathering-points so as to leave no unraked ground and so the adjacent points of the oppositely moving carriers will move in overlapping paths. The rake-heads and points are gravity-operated into normal position and their pivots are disposed so the points are free to swing upwardly during the return stroke to clear any hay passing over the elevator or in transit thereto, if any hay is encountered by the gathering-points. Being gravity-held, the points will readily yield to the hay passing thereunder whenever necessary. The gathering-points are formed in pairs and secured to the head by clips 76 and bolts 77. An abutment 78 is adapted to engage bracket 74 to limit the upward play of the head.

Manifestly the invention is not to be understood as restricted to the precise details shown and described but may be modified within the scope of the appended claims without departing from the spirit and scope of the invention.

Having thus described the invention, what I claim as new and desire to secure by Letters Patent, is:

1. In a hay-loader, the combination of an elevator-frame, carrying-wheels, a plurality of reciprocable rake-carriers, rake-operating levers pivoted to the rake-carriers, connections to which said levers are pivoted respectively, said connections being mounted to travel concentrically with the carrying-wheels, and medial supports for said levers and on which they can swing as they are operated by said connections so the rake-carriers will be operated vertically and longitudinally by said levers.

2. In a hay-loader, the combination of an elevator-frame, carrying-wheels, a plurality of reciprocable rake-carriers, rake-operating levers respectively pivoted to the rake-carriers, oppositely disposed connections at each side of the frame to which said levers are pivoted respectively, said connections being mounted to travel concentrically with the carrying-wheels, and medial supports for the levers and on which they can swing as they are operated by said connections so the rake-carriers will be operated vertically and longitudinally by said levers.

3. In a hay-loader, the combination of an elevator-frame, carrying-wheels, a plurality of reciprocable rake-carriers, rake-operating-levers respectively pivoted to said carriers, connections to which said levers are pivoted, said connections being mounted to rotate concentrically with the carrying-wheels, and tracks by which the levers are supported medially and on which they can swing as they are operated by said connections so the rake-carriers will be operated vertically and longitudinally by the levers.

4. In a hay-loader, the combination of an elevator-frame, carrying-wheels, a plurality of reciprocable rake-carriers, rake-operating levers respectively pivoted to said carriers, connections to which said levers are pivoted, said connections being mounted to rotate concentrically with the carrying-wheels, medial abutments on said levers, and tracks for said abutments.

5. In a hay-loader, the combination of an elevator-frame, carrying-wheels, a plurality of reciprocable rake-carriers, rake-operating levers respectively pivoted to said carriers, connections to which said levers are pivoted, said connections being mounted to rotate concentrically with the carrying-wheels, rollers medially journaled on said levers, and tracks for said rollers.

6. In a hay-loader, the combination of an elevator-frame, carrying-wheels, a carriage-axle, a plurality of reciprocable rake-carriers, rake-operating levers pivoted to said rake-carriers respectively, cranks mounted to travel concentrically with said axle and to which the levers are pivoted respectively, and medial supports for said levers on which they can swing as they are operated by the cranks, so the rake-carriers will be operated vertically and longitudinally by said levers.

7. In a hay-loader, the combination of an elevator-frame, carrying-wheels, a carriage-axle, a plurality of reciprocable rake-carriers, rake-operating levers pivoted to said rake-carriers respectively, oppositely disposed cranks mounted to travel concentrically with said axle and to which the levers are pivoted respectively, and medial supports for said levers on which they can swing as they are operated by the cranks, so the rake-carriers will be operated vertically and longitudinally by said levers.

8. In a hay-loader, the combination of an elevator-frame, carrying-wheels, a carriage-axle, a plurality of reciprocable rake-carriers, rake-operating levers pivoted to said rake-carriers respectively, cranks mounted to travel concentrically with said axle and to which the levers are pivoted, and tracks for supporting said levers medially and on which said levers can swing so the rake carriers will be operated vertically and longitudinally by said levers.

9. In a hay-loader, the combination of an elevator-frame, carrying-wheels, a carriage-axle, a plurality of reciprocable rake-carriers, rake-operating levers pivoted to said rake-carriers respectively, cranks mounted to travel concentrically with said axle and to which the levers are pivoted, abutments medially disposed on said levers, and tracks on which said abutments can travel so the levers will swing to operate the rake-carriers vertically and longitudinally.

10. In a hay-loader, the combination of an elevator-frame, carrying-wheels, a carriage-axle a plurality of reciprocable rake-carriers rake-operating levers pivoted to said rake-carriers respectively, cranks mounted to travel concentrically with said axle and to which the levers are pivoted, rollers medially disposed on said levers, and tracks on which said rollers can run so the rake-carriers will be operated vertically and longitudinally by said levers.

11. In a hay-loader, the combination of an elevator-frame, carrying-wheels, a carriage-axle, a plurality of oppositely disposed cranks on said axle, a plurality of reciprocable rake-carriers, rake-operating levers respectively connected to said cranks, abutments medially disposed on said levers, and tracks for said abutments and on which the levers can swing so the rake-carriers will be operated vertically and longitudinally thereby.

12. In a hay-loader, the combination of an elevator-frame, carrying-wheels, a carriage-axle, a plurality of reciprocable rake-carriers, rake-operating levers pivoted to said rake-carriers respectively, cranks mounted to travel concentrically with said axle and to which the levers are pivoted, abutments medially disposed on said levers, tracks on which said abutments can travel so the levers will swing to operate the rake-carriers vertically and longitudinally, and lateral guides for said levers.

13. In a hay-loader, the combination of an elevator-frame, carrying-wheels, a plurality of oppositely disposed cranks at each side of the frame mounted to rotate concentrically with the carrying-wheels and operated thereby, a plurality of reciprocable rake-carriers and rake-operating levers pivoted to said cranks and to the rake-carriers respectively.

14. In a hay-loader, the combination of an elevator-frame, carrying-wheels, a plurality of oppositely disposed cranks at each side of the frame mounted to rotate concentrically with the carrying-wheels and operated thereby, a plurality of reciprocable rake-carriers, rake-operating levers pivoted to said cranks and the rake-carriers respectively, and means for guiding the levers laterally.

15. In a hay-loader, the combination of an elevator-frame, carrying-wheels, a plurality of oppositely disposed cranks at each side of the frame mounted to rotate concentrically with the carrying-wheels and operated thereby, a plurality of reciprocable rake-carriers, rake-operating levers pivoted to said cranks and the rake-carriers respectively, and means for adjusting the travel of the rake-carriers with respect to the ground.

16. In a hay-loader, the combination of an elevator-frame, carrying-wheels, a carriage-axle oppositely disposed cranks on said axle at each side of the frame and operatively connected to the carrying-wheels, a plurality of reciprocable rake-carriers, and rake-operating levers pivoted to said cranks and rake-carriers respectively.

17. In a hay-loader, the combination of an elevator-frame, carrying-wheels, a plurality of reciprocable rake-carriers, rotating connections, rake-operating levers pivoted to said rotating connections and connected to said rake-carriers respectively, gathering-teeth mounted on the carriers, medial abutments on said levers, and tracks on which said abutments travel formed to guide the levers so that when the rotating connections are rotated the gathering-teeth will travel in substantially rectilinear path as they travel forwardly over the ground.

18. In a hay-loader, the combination of an elevator-frame, carrying-wheels, a plurality of reciprocable rake-carriers, rotating connections, rake-operating levers pivoted to said rotating connections and connected to said rake-carriers respectively, gathering-teeth mounted on the carriers, rollers medially mounted on the levers, and tracks for said rollers formed to guide the levers so that when the rotating connections are rotated the gathering-teeth will travel in substantially rectilinear path as they travel forwardly over the ground.

19. In a hay-loader, the combination of an elevator frame, carrying-wheels, a plurality of reciprocable rake-carriers, rotating connections driven by the carrying-wheels, rake-operating levers pivoted to said rake-carriers and to said rotating connections respectively, elongated tracks secured to the frame, and abutments on the levers between their pivotal connections for traveling on the tracks to guide said levers medially.

20. In a hay-loader, the combination of an elevator frame, carrying-wheels, a plurality of reciprocable rake-carriers, rotating connections driven by the carrying-wheels, rake-operating levers pivoted to said rake-carriers and to said rotating connections respectively, elongated tracks secured to the frame, and rollers on the levers between their pivotal connections for traveling on the tracks to guide said levers medially.

21. In a hay-loader, the combination of an elevator frame, carrying-wheels, a plurality of reciprocable rake-carriers, rotating connections driven by the carrying-wheels, rake-operating levers pivoted to said rake-carriers and to said rotating connections respectively elongated tracks secured to the frame, abutments on the levers between their pivotal connections for traveling on the tracks to guide said levers medially, and means for adjusting the tracks.

22. In a hay-loader, the combination of an elevator-frame, carrying-wheels, a plurality of reciprocable rake-carriers, rotating connections driven by the carrying-wheels, rake-operating levers pivoted to said rake carriers and to said rotating connections respectively, and curved tracks for guiding said levers between their pivotal connections to control the vertical movement of the rake-carriers.

23. In a hay-loader, the combination of an elevator-frame, carrying-wheels, a plurality of reciprocable rake-carriers, rotating connections driven by the carrying-wheels, rake-operating levers pivoted to said rake-carriers and to said rotating connections respectively, rollers on the levers between their pivotal connections and curved tracks for guiding said levers medially to control the vertical movement of the carriers.

24. In a hay-loader, the combination of an elevator-frame, carrying-wheels, a plurality of reciprocable rake-carriers, rake-operating levers, means for operating the levers, tracks for guiding said levers to control their vertical movement, said levers having abutments for engaging the tracks and operated to engage the same portion of the track as the levers are operated in either direction.

25. In a hay-loader, the combination of an elevator-frame, carrying-wheels, a plurality of reciprocable rake-carriers, rake-operating levers, means for operating the levers, tracks for guiding said levers to control their vertical movement, rollers mounted on said levers for engaging the tracks and operated to engage the same portion of the track when the levers are operated in either direction.

26. In a hay-loader, the combination of an elevator-frame, carrying-wheels, a plurality of rake-carriers, rake-operating levers, operating-means for said levers, tracks for guiding said levers, and adjustable hangers for said tracks.

27. In a hay-loader the combination of an elevator-frame, carrying-wheels, a plurality of rake-carriers, rake-operating levers, operating-means for said levers, tracks for guiding said levers, and screw-operated adjusting-means for raising and lowering said tracks.

28. In a hay-loader, the combination of a reciprocable rake-carrier, means for operating said carrier, a rake-head pivotally connected to said carrier, a plurality of gathering-teeth mounted on said head, and an abutment secured to the carrier for limiting the pivotal movement of the head in one direction during the operating-stroke of the carrier, to hold the teeth in operative position, said head being free to swing as it is operated in the opposite direction to allow the teeth to pass over the material being loaded and to be shifted by said material.

29. In a hay-loader, the combination of a rake-carrier, means for operating said carrier, a rake-head pivotally connected to said carrier, a plurality of resilient gathering-teeth mounted on said head, and an abutment secured to the carrier for limiting the pivotal movement of the head in one direction during the operating-stroke of the carrier to hold the teeth in operative position, said head being free to swing as it is operated in the opposite direction to allow the teeth to pass over the material being loaded and to be shifted by said material.

30. In a hay-loader, the combination of a rake-carrier, means for operating said carrier, a rake-head pivotally connected to said carrier, a plurality of gathering-teeth having coils extending around the head, and an abutment secured to the carrier for limiting the pivotal movement of the head in one direction during the operating-stroke of the carrier to hold the teeth in operative position, said head being free to swing as it is operated in the opposite direction to allow the teeth to pass over the material being loaded and to be shifted by said material.

31. In a hay-loader, the combination of a rake-carrier, operating-means for the carrier, a forked support secured to the carrier, a head pivoted to said support, the latter having an abutment for limiting the movement of the head during the operating-stroke of the carrier, and resilient gathering-points mounted on the head, said head being free to swing as the carrier is operated in the opposite direction to permit the teeth to pass over the material being loaded and to be shifted thereby.

32. In a hay-loader, the combination of a rake-carrier, a forked support secured to said carrier and having abutments thereon, a rake-head, gathering-points mounted on the head, eye-and-pin connections between the rake-head and said forked support, said head engaging said abutment during the operating-stroke of the carrier to hold the teeth in operative position, said head being free to swing in one direction as the teeth are moved backwardly to permit the teeth to pass over the material being loaded and be shifted thereby.

33. In a hay loader, the combination of an elevator-frame, carrying wheels, an axle for said wheels provided with a pair of oppositely disposed cranks rotating concentrically with the wheel axle, reciprocable rakes, rake-operating levers, each connected at one end with one of said cranks and connected at the other end with one of the rakes, to operate them in opposite directions, and a medial fulcrum for each of the levers.

34. In a hay loader, the combination of an elevator-frame, carrying wheels, an axle for said wheels provided with a pair of oppositely disposed cranks rotating concentrically with the wheel axle, reciprocable rakes, rake operating levers, each connected at one end with one of said cranks and connected at the other end with one of the rakes, to operate them in opposite directions, and a traveling fulcrum for each of the levers.

35. In a hay loader, the combination of an elevator-frame, carrying wheels, an axle for said wheels provided with a pair of oppositely disposed cranks rotating concentrically with the wheel-axle, reciprocable rakes, rake-operating levers, each pivoted at one end to one of said cranks and connected at the other end with one of the rakes, to operate them in opposite directions, and a medial fulcrum for each of the levers.

36. In a hay loader, the combination of an elevator-frame, carrying wheels, an axle for said wheels provided with a pair of oppositely disposed cranks rotating concentrically with the wheel-axle, reciprocable rakes, rake-operating levers, each pivoted at one end to one of said cranks and connected at the other end with one of the rakes, to operate them in opposite directions, and a traveling fulcrum for each of the levers.

ORBIN F. SMITH.

Witnesses:
　HATTIE ALLEN,
　EDITH HART.